US010283882B2

(12) United States Patent
Quaedvlieg et al.

(10) Patent No.: US 10,283,882 B2
(45) Date of Patent: May 7, 2019

(54) LOCKING GROUNDING CLAMP

(71) Applicant: Quanta Associates, L.P., Houston, TX (US)

(72) Inventors: Phillip Howard Quaedvlieg, Langley (CA); David Karl Wabnegger, Langley (CA); Janos Csaba Toth, Vancouver (CA); Daniel Neil O'Connell, Oliver (CA)

(73) Assignee: Quanta Associates, L.P., Houston, TX (US)

( * ) Notice: Subject to any disclaimer, the term of this patent is extended or adjusted under 35 U.S.C. 154(b) by 0 days.

(21) Appl. No.: 15/584,888

(22) Filed: May 2, 2017

(65) Prior Publication Data

US 2017/0317437 A1    Nov. 2, 2017

Related U.S. Application Data

(60) Provisional application No. 62/330,377, filed on May 2, 2016.

(51) Int. Cl.
*H01R 11/14* (2006.01)
*H01R 43/22* (2006.01)
*H01R 11/15* (2006.01)
*H02G 1/02* (2006.01)
*H01R 43/00* (2006.01)

(52) U.S. Cl.
CPC ............ *H01R 11/15* (2013.01); *H01R 43/22* (2013.01); *H02G 1/02* (2013.01); *H01R 11/14* (2013.01); *H01R 43/00* (2013.01); *H01R 43/002* (2013.01)

(58) Field of Classification Search
CPC ........ H01R 11/15; H01R 43/22; H01R 11/14; H01R 43/00; H02G 1/02

USPC ........ 439/477; 269/240, 245, 246, 249, 260; 81/53.1
See application file for complete search history.

(56) References Cited

U.S. PATENT DOCUMENTS

| | | | | |
|---|---|---|---|---|
| 1,987,584 A | * | 1/1935 | Bodendieck | H01R 11/15 439/480 |
| 2,235,274 A | | 3/1941 | Trehern | |
| 2,508,778 A | | 5/1950 | Spears | |
| 2,509,083 A | | 5/1950 | Bodendieck | |
| 2,966,817 A | * | 1/1961 | Wengen | H01R 11/14 439/791 |
| 3,036,286 A | | 5/1962 | Gorc et al. | |

(Continued)

OTHER PUBLICATIONS

Young, Lee W., International Search Report for International application No. PCT/US17/30621, dated Sep. 8, 2017, 4 pages, ISA/US, Alexandria, Virginia, United States.

(Continued)

*Primary Examiner* — Renee S Luebke
*Assistant Examiner* — Paul Baillargeon
(74) *Attorney, Agent, or Firm* — Oathout Law Firm; Mark A. Oathout; Antony C. Edwards

(57) ABSTRACT

A grounding clamp includes a safety lock-out which locks the operation of the clamp in the absence of a hot-stick. A clamping member cooperates with a frame having an arm, and is selectively biasable by a user to translate the clamping member relative to the frame to clamp a conductor between the clamping member and arm. The lock-out cooperates with the clamping member to prevent the translation of the clamping member unless in the presence of an insulating tool such as a hot-stick.

16 Claims, 5 Drawing Sheets

(56) References Cited

U.S. PATENT DOCUMENTS

| | | | | | |
|---|---|---|---|---|---|
| 3,923,363 | A | * | 12/1975 | Kraft | H01R 4/2408 |
| | | | | | 439/413 |
| 4,846,725 | A | * | 7/1989 | Williams | H01R 11/15 |
| | | | | | 24/135 R |
| 6,943,291 | B2 | * | 9/2005 | Brittain | H02G 7/14 |
| | | | | | 174/40 CC |
| 7,111,526 | B1 | * | 9/2006 | Flojo | B25B 5/06 |
| | | | | | 294/118 |
| 8,672,716 | B2 | * | 3/2014 | De France | H01R 4/42 |
| | | | | | 439/803 |

OTHER PUBLICATIONS

Young, Lee W., Written Opinion of the International Searching Authority for International application No. PCT/US17/30621, dated Sep. 8, 2017, 7 pages, ISA/US, Alexandria, Virginia, United States.

* cited by examiner

LOCKING GROUNDING CLAMP

FIELD OF THE INVENTION

The present disclosure is generally in the field of grounding clamps used for grounding high voltage conductors. More particularly, the present disclosure relates to grounding clamps which have locks that are actuable through the use of an insulated line tool.

BACKGROUND

Electrical workers use grounding cables on an almost daily basis in the industry to help manage dangerous voltages and currents in de-energized power lines and electrical equipment. Grounds are designed to be installed and removed using an insulating tool, for example an insulating tool called a Grip-All stick or Shotgun, to keep the worker at a safe distance from the hazard.

When installing grounds, the first connection is always made to a ground point. Workers will normally make this connection by hand instead of with the insulating tool, as there is no hazardous energy when making this connection.

Any time a connection is made to a conductor or apparatus that could be at a different electrical potential from ground, this connection must be made using an insulating tool. This is especially true in a high voltage environment (for example, over 69 Kv). Due to the design of conventional ground clamps, they can be installed and removed by hand instead of being installed using an insulating tool. It is not uncommon in applicant's experience for workers to make the mistake of installing a ground clamp on a conductor, or removing one from a conductor by hand instead of with an insulating tool. This potentially exposes the worker to a voltage potential and consequently may result in electrocution of the worker. To applicant's knowledge, this has accounted for fatalities and electrocution incidents in the industry.

Consequently, there is a need in the industry for a locking ground clamp that operates in combination with an insulating tool so as to prevent the worker or lineman from being able to operate the ground clamp without the use of the insulating tool. This is to inhibit workers or linemen from attempting to install the ground clamp by hand. To accomplish this a locking mechanism is described below which prevents manual operation of the ground clamp as the ground clamp can only be actuated or un-locked with or in the presence of the insulating tool.

SUMMARY

A grounding clamp includes a safety lock-out which locks the operation of the clamp in the absence of a hot-stick. The clamp includes a frame and a first clamping member defining a capture cavity and an opening. The opening provides access into the cavity for a conductor to be captured in the cavity. The first clamping member cooperates with the frame, and is selectively biasable by a user between an unclamped position wherein the clamping member is retracted and a clamped position wherein by translation of the first clamping member relative to the frame the conductor is clamped between the first clamping member and an arm or second clamping member on the frame when the conductor is positioned in the cavity. The lock-out has first and second positions and cooperates with the first clamping member to prevent the selective biasing of the first clamping member from the unclamped position to the clamped position when the lock-out is in the first position. The lock-out is normally biased into the first position. In the second position, the selective biasing of the first clamping member to the clamped position is enabled. A hot-stick head is mountable onto, or mounted on, an end of the hot-stick or other insulating tool (collectively referred to herein as a hot-stick). The hot-stick head is adapted to couple onto the frame and to cooperate with the lock-out to bias the lock-out into the second position when the head is coupled with the frame.

In an embodiment of the present disclosure, the second clamping member is in opposed facing relation to the first clamping member, and located at an opposite end of the frame from the first clamping member. The first clamping member includes a threaded bore. A correspondingly threaded shaft is rotatably journalled in the threaded bore, whereby rotation of the shaft in the bore translates the first clamping member relative to; that is away from or towards, the second clamping member. The frame includes a first couple. The hot-stick head includes a second couple couplable with the first couple on the frame whereby the head of the hot-stick is selectively and detachably coupled onto the frame.

In an embodiment of the present disclosure, the lock-out includes a ferrous member resiliently biased into a first position and the hot-stick head includes a magnet cooperating with the ferrous member to magnetically bias the ferrous member, and thereby the lock-out, into the second position when the head is coupled with the frame.

In an embodiment of the present disclosure, the ferrous member is resiliently biased by a resilient biasing force into a locking position when the lock-out is in the first position to thereby prevent rotation of the threaded shaft in the threaded bore, and wherein a magnetic attractive force of the magnet is greater than the resilient biasing force whereby the lock-out is magnetically biased into the second position against a return biasing of the resilient biasing force.

DETAILED DESCRIPTION

Figures 1, 2:
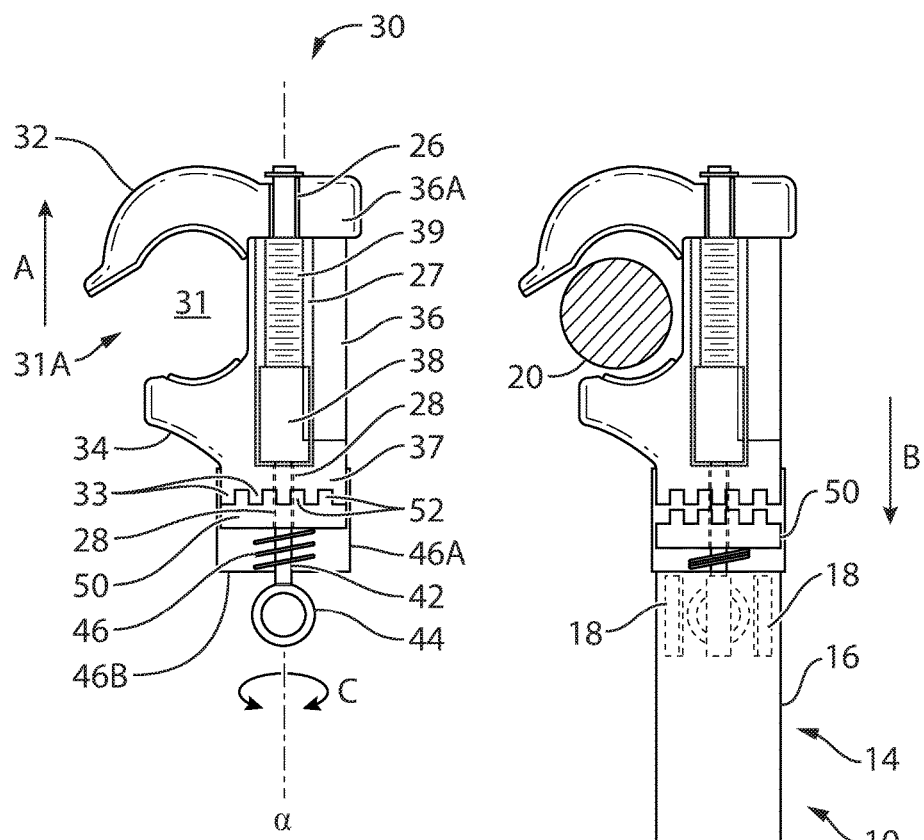
FIG. 1 is a partially cut away view, illustrating an embodiment of the present disclosure in a locked position.
FIG. 2 is a partially cut away view, illustrating an embodiment of the present disclosure in an unlocked position.

In an embodiment of the present disclosure, a locking grounding clamp 30 comprises a frame 36 supporting a clamping member 34. The frame includes a clamping member 32 at opposite-ends of the frame. The clamping member and frame define a capture cavity 31 therebetween having an opening 31A. The capture cavity 31 is sized to receive conductor 20, shown in cross section in FIG. 2, via opening 31A. Advantageously capture cavity 31 conforms in shape, and so as to encircle, conductor 20.

Square shaft 42 is supported on or within the frame 36 and disposed alongside clamping member 34. Square shaft 42

(which is square in cross section) is inserted through opening 26 at the upper end 36A of frame 36, through a channel or cut-out 27 running along frame 36, and through an opening 28 located in the locking portion 37 of frame 36. Ferrous lock-out ring 50 is mounted adjacent portion 37. The square shaft 42 is journalled through a square opening (not shown) in the center of ring 50. A coupling eye 44 is mounted or formed at the end of square shaft 42 adjacent ring 50, opposite portion 37 within spring housing 46A. The square shaft 42 is also inserted through the hollow centre of a threaded shaft 39. Threaded shaft 39 is provided with a square shaped bore sized so as to slidably snugly couple with the square shaft 42 whereby rotating the square shaft 42 in direction C about a rotational axis α extending through the centre of the square shaft 42 results in rotating the threaded shaft 39 in the same rotational direction as rotation of shaft 42. Square shaft 42 is free to rotate within openings 26, 28 and within channel 27. For example, openings 26, 28 may be round.

A threaded bore is formed in collar 38. Collar 38 is coupled to clamping member 34. The threading of the threaded bore in collar 38 rotatably mates with the threading on the external surface of the threaded shaft 39. Thus, an insulating tool grasping the coupling eyelet 44 and rotating the coupling eyelet 44 and the square shaft 42 in direction C about the axis of rotation α results in rotation of both the square shaft 42 and the threaded shaft 39. Rotation in a first direction about axis α, urges clamping member 34 in direction A towards clamping arm 32. Rotating the coupling eyelet 44 in an opposite direction translates clamping member 34 in direction B, away from clamping arm 32.

As stated above, lock-out ring 50 is disposed adjacent the locking portion 37 of the frame 36, and has a square channel through its centre. Advantageously, lock-out ring 50 is ferrous. The square channel in ring 50 is sized so as to snugly slidably receive the square shaft 42. Ring 50 thus also rotates in direction C along with the rotation of square shaft 42 about the rotational axis α. Ring 50 includes a plurality of teeth 52. Locking portion 37 similarly comprises a plurality of teeth 33. The teeth 33 on locking portion 37 are in opposed facing relation so as to complement the teeth 52 on ring 50 such that when ring 50 is urged towards the locking portion 37 of frame 36, teeth 33 releasably lock with teeth 52. In particular, teeth 33 interleave between teeth 52, thereby preventing rotation of ring 50 relative to locking portion 37 and frame 36.

Ring 50 and spring 46 are located in spring housing 46A in the end 37 of frame 36 corresponding to eyelet 44. Spring 46 is disposed between the base 46B of spring housing 46A and ring 50. Spring 46 surrounds the square shaft 42. The spring 46 resiliently biases ring 50 against the locking portion 37 of the frame 36, causing the plurality of teeth 33 on locking portion 37 to couple with the plurality of teeth 52 on ring 50. Thus, when ring 50 is biased against locking portion 37, the coupling of the plurality of teeth 33 with the plurality of teeth 52 prevents rotation of ring 50 relative to the frame 36 and locking portion 37, thereby also preventing rotation square shaft 42 about rotational axis α. This prevents linear translation of clamping member 34 relative to frame 36.

As illustrated in FIG. 2, hot-stick 10 includes an insulated body 12, a head 14, a coupling clamp 16 and a plurality of magnets 18 (shown in dotted outline). The plurality of magnets 18 and the coupling clamp hook 16A (seen in FIG. 4) are disposed within the head 14.

In operation, as illustrated in FIG. 2, a lineman seeking to operate the grounding clamp 30 will grasp the insulated body 12 of a hot-stick 10 and manipulate the coupling clamp 16 so as to couple the coupling clamp hook 16A to the coupling eyelet 44. Upon coupling the coupling clamp 16 to the coupling eyelet 44, the plurality of magnets 18 disposed within the head 14 attract ring 50 in direction B, causing the plurality of teeth 33 on locking portion 37 to uncouple from the plurality of teeth 52 on ring 50. Once ring 50 becomes uncoupled from the locking portion 37 of frame 36, the square shaft 42 may be freely rotated. By rotating, using a twisting motion in direction D about the length (or longitudinal axis) of hot-stick 10, the lineman may then rotate square shaft 42 in direction C. This results in a corresponding rotation of the threaded shaft 39, thereby causing clamping member 34 to translate linearly in either direction A or direction B, depending on the direction of rotation of square shaft 42. In this manner, the capture cavity 31 may only be opened to receive a conductor 20 via opening 31A or closed to enclose a conductor 20 within cavity 31 when the coupling clamp 16 of the hot-stick 10 is coupled with the coupling eyelet 44 so as to disengage the lock-out ring.

Once the grounding clamp 30 has either been engaged around or disengaged from a conductor 20, the lineman may unhook the coupling clamp 16 from the coupling eyelet 44 and remove the hot-stick 10 from the locking ground clamp 30. By removing the hot-stick 10 from the grounding clamp 30, and therefore removing the magnetic field caused by the plurality magnets 18 disposed within the head 14, the magnetic force causing the ferrous member 50 to move in direction B is removed and therefore the spring force applied in direction A by spring 46 against ring 50 will once again resiliently urge ring 50 in direction A towards locking portion 37, whereby the plurality of teeth 33 once again engage with the plurality of teeth 52 and bring the grounding clamp 30 into the locking position, as shown in FIG. 1.

Figure 3:
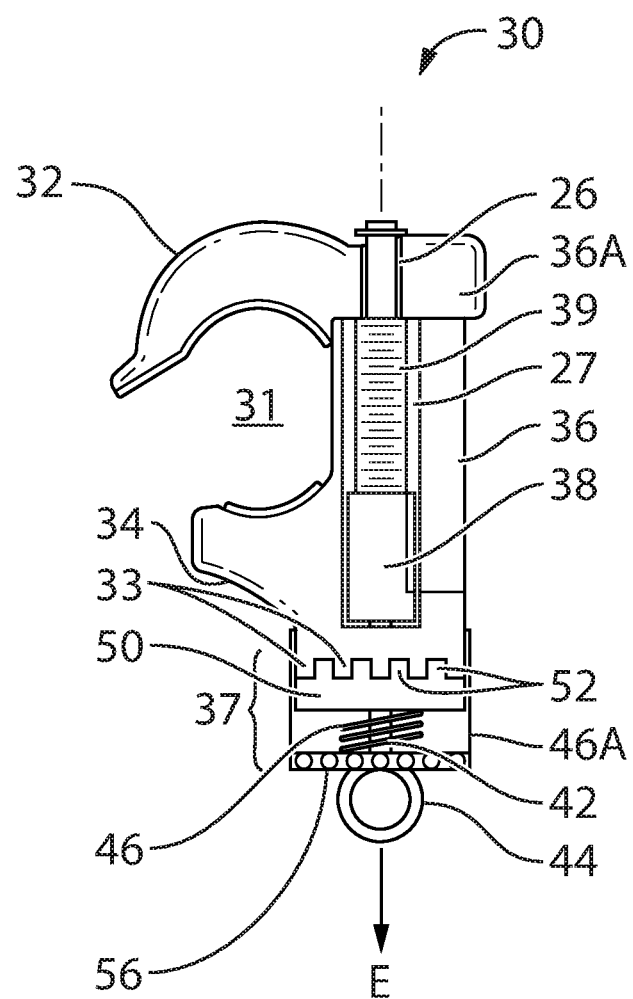
FIG. 3 is an alternative embodiment of the grounding clamp of FIG. 1, in the locked position.

Additional embodiments of the locking grounding clamp are seen in FIGS. 3-6. In FIG. 3, the grounding clamp is similar to the above described embodiment of FIGS. 1 and 2 which uses magnets, but the lock-out ring 50 is connected directly to the locking mechanism so that pulling ring 50 down in direction E retracts teeth 52 from interlocking between teeth 33. As before, shaft 42 is journalled in hollow shaft 39 and provides a movable connection, for example a telescopic coupling, to the threaded shaft 39. The spring 46 is a very stiff spring to keep the lock-out in the locked position, and to discourage manual unlocking of the lock-out ring 50.

Figure 4:
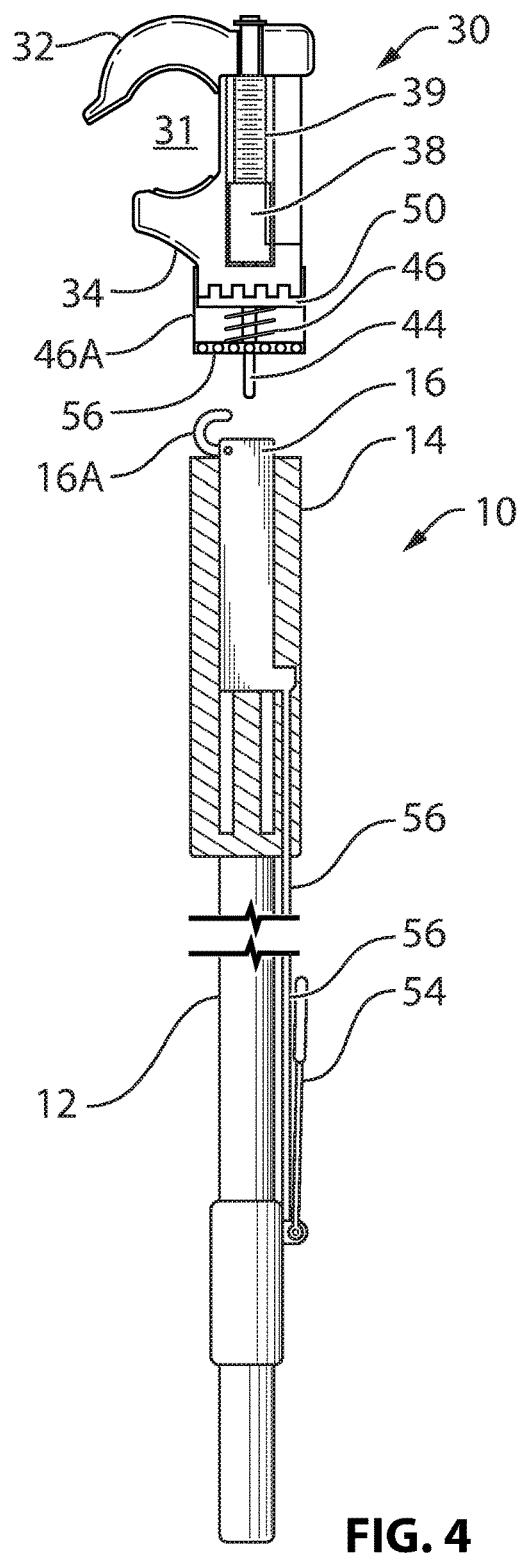
FIG. 4 is the grounding clamp of FIG. 3 and a hot-stick ready for mounting to the grounding clamp.

As seen in FIG. 4, the insulating hot-stick 10 may incorporate a lever 54 to overcome the very stiff spring tension and to release the lock-out mechanism by uncoupling the lock-out ring 50, allowing the ground clamp eye 44 to be turned in direction C to rotate the shaft 42 to thereby open or close the clamp member 54 onto the conductor 20.

A bearing within bearing interface 56 may be incorporated into the end of the insulating hot-stick 10 or into the ground clamp interface with the hot-stick, for example into the base of spring housing 46A, to allow twisting rotation of the hot-stick when under the spring tension.

In another embodiment a universal joint (not shown) may be incorporated into the end of the insulating hot-stick to allow operation when the stick and ground clamp are not in alignment; that is, not aligned longitudinally.

Figure 5:
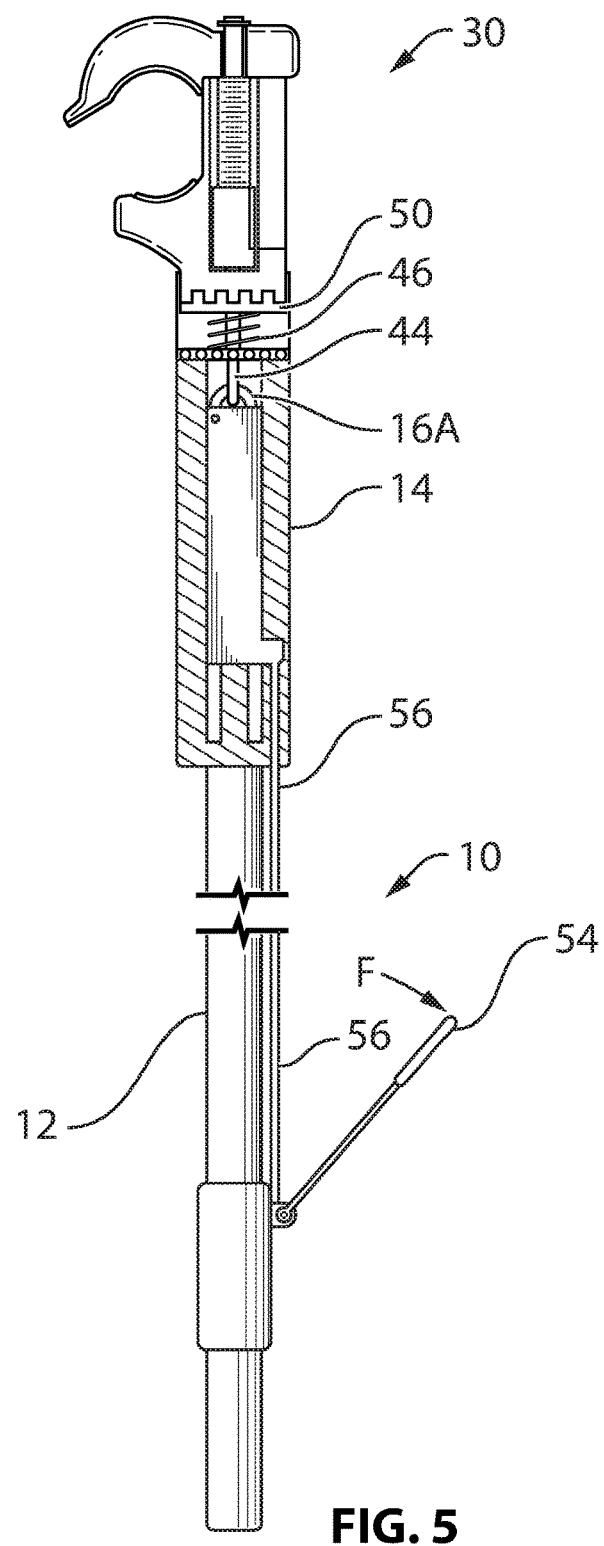
FIG. 5 is the grounding clamp and hot-stick of FIG. 4 with the grounding clamp mounted to the hot-stick and the grounding clamp in the locked position.

As seen in FIG. 5 the hot-stick is mounted to the clamp 30 when the lever 54 is partially actuated in direction F to capture the clamp 30 by engaging hook 16A on the hot-stick 10 with the eye 44. The locking mechanism is still engaged as the lock-out ring 50 remains in its locked position.

Figure 6:
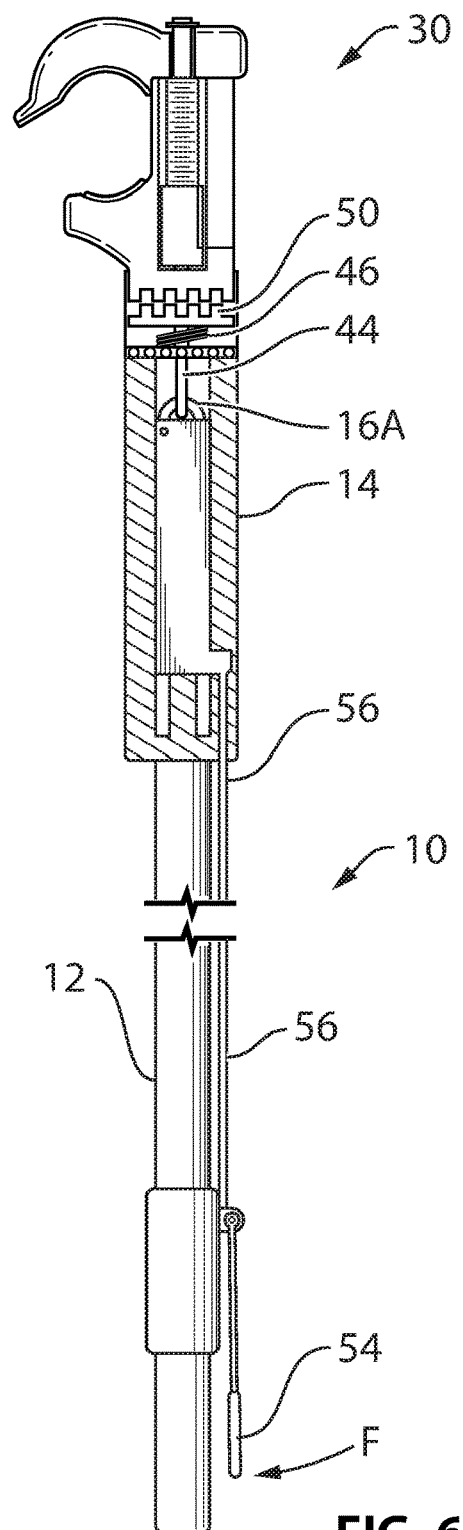
FIG. 6 is the grounding clamp and hot-stick of FIG. 5 with the grounding clamp unlocked by actuation of the hot-stick.

As seen in FIG. 6, to unlock the grounding clamp, so as to allow its use by the lineman, the lever 54 is fully actuated by pulling the lever fully down in direction F. This retracts the actuating rod 56 connected to the hook 16A on the upper end of the hot-stick 10 along the hot-stick thereby pulling down on the eye 44 on the base of the grounding clamp. Pulling down on eye 44 also pulls down ring 50 onto the spring 46 which releases the teeth 52 on ring 50 in the locking mechanism. The bearing 56 allows the hot-stick to be twisted in direction D while under tension from the compressed spring 46.

As will be appreciated by one skilled in the art, various other mechanisms may be employed to actuate a lock-out locking mechanism disabling the grounding clamp so that the lock-out will lock the operation of the clamp unless in the presence of an insulating tool such as a hot-stick. For example, the lockout does not necessarily have to employ mating sets of teeth as other braking mechanisms, including those relying on friction or adhesion, between mating components may also work. Further, the spring and magnet arrangement in the lock-out described above may be reversed. Also the proximity or presence of the hot-stick, so as to unlock the lock-out, may be detected by the lock-out other than by the use of a magnetic field, and operate other than by a magnet field overcoming a resilient biasing of one locking component against another. For example, the mating of the hot-stick with the clamp may mechanically disengage a spring-loaded latch mechanism, wherein for example, a pushing of the hot-stick against a plunger within a coupling housing on the clamp will disengage the latch mechanism in the lock-out.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

The invention claimed is:

1. A grounding clamp having a safety lock-out mechanism cooperating with a hot-stick, the clamp mountable onto the hot-stick and comprising:
    a frame and a clamping member defining a capture cavity and an opening, said opening providing access into said cavity for a conductor to be captured in said cavity,
    said clamping member cooperating with said frame and selectively biasable by a user between an unclamped position wherein said clamping member is retracted to open the cavity and the opening and a clamped position wherein the cavity and the opening are closed so that the conductor is clamped against said frame by said clamping member when the conductor is positioned in said cavity,
    a lock-out mounted on said frame and cooperating with said clamping member, said lock-out adapted to lock movement of said clamping member in the absence of the hot-stick so as to prevent movement of said clamping member relative to said frame, and to unlock said clamping member to allow movement of said clamping member relative to said frame when in proximity to the hot-stick, wherein said lock-out has first and second positions and said lock-out is normally biased into said first position, and wherein, in said first position, said selective biasing of said clamping member between said unclamped position and said clamped position is prevented, and wherein, in said second position, said selective biasing of said clamping member between said unclamped position and said clamped position is enabled, and wherein a hot-stick head is adapted to couple onto said frame and to cooperate with said lock-out to bias said lock-out into said second position when said hot-stick head is coupled with said frame, wherein said hot-stick head is adapted to be mounted onto on an end of the hot-stick, and wherein said lock-out includes a lock-out ring resiliently biased into said first position and said hot-stick head includes an actuator cooperating with said ring to bias said ring and thereby said lock-out into said second position when said head is coupled with said frame, and
    whereby, when said frame is mounted on the hot-stick, the clamping member is moveable to clamp the conductor positioned in the cavity.

2. The clamp of claim 1 wherein said clamping member has first and second opposite ends, and includes a threaded bore coupled to said second end, and wherein said frame includes a correspondingly threaded shaft, said threaded shaft rotatably journalled in said threaded bore.

3. The clamp of claim 2, wherein a second end of said frame includes a first couple, and wherein said hot-stick head includes a second couple couplable with said first couple when said head is coupled onto said frame.

4. The clamp of claim 2 wherein said ring is said resiliently biased by a resilient biasing force into a locking position when said lock-out is in said first position to thereby prevent said rotation of said threaded shaft in said threaded bore, and wherein said actuator includes at least one magnet, wherein a magnetic attractive force of said at least one magnet is greater than said resilient biasing force whereby said lock-out is magnetically biased into said second position against a return biasing of said resilient biasing force.

5. The clamp of claim 4 wherein said resilient biasing force is provided by a spring, and wherein said frame includes a spring housing which contains said spring.

6. The clamp of claim 5 wherein said threaded shaft has opposite first and second ends, and wherein said second end extends from said frame so as to extend from said first couple, said second end of said threaded shaft adapted to engage said hot-stick head whereby a twisting movement of said hot-stick head caused by a corresponding twisting of the hot-stick about its length causes rotation of said threaded shaft in said bore to thereby translate said clamping member relative to said frame.

7. The clamp of claim 6 wherein said shaft includes an eye at said second end of said shaft, and said head is adapted to releasably couple to said eye.

8. The clamp of claim 7 wherein the frame includes a clamping arm in opposed facing relation to said clamping member, at opposite ends of said frame.

9. A grounding method using a grounding clamp having a safety lock-out mechanism cooperating with a hot-stick, the clamp mountable onto the hot-stick, the method comprising:
    a) providing a frame and a clamping member defining a capture cavity and an opening, said opening providing access into said cavity for a conductor to be captured in said cavity, said clamping member cooperating with said frame and selectively biasable by a user between an unclamped position wherein said clamping member is retracted to open the cavity and opening and a clamped position wherein the cavity and opening are closed so that the conductor is clamped against said frame by said clamping member when the conductor is positioned in said cavity,
    b) providing a lock-out mounted on said frame and cooperating with said clamping member, said lock-out adapted to lock said clamping member in the absence of the hot-stick to prevent movement of said clamping member relative to said frame, and to unlock said clamping member to allow movement of said clamping member in the presence of the hot-stick, wherein said lock-out has first and second positions and said lock-out is normally biased into said first position, and wherein, in said first position, said selective biasing of said clamping member between said unclamped position and said clamped position is prevented, and wherein, in said second position, said selective biasing of said clamping member between said unclamped position and said clamped position is enabled, and wherein a hot-stick head is adapted to couple onto said frame and to cooperate with said lock-out to bias said lock-out into said second position when said hot-stick head is coupled with said frame, wherein said hot-stick head is adapted to be, mounted onto on an end of the hot-stick, and wherein said lock-out includes a lock-out ring resiliently biased into said first position and said hot-stick head includes an actuator cooperating with said ring to bias said ring and thereby said lock-out into said second position when said head is coupled with said frame, c) mounting the frame onto the hot-stick so as to couple the hot-stick head with the frame and to unlock the lock-out whereby the clamping member is movable to clamp the conductor positioned in the cavity, d) positioning the conductor in the cavity; and, e) rotating the hot-stick with a twisting motion about its length so as to translate the first clamping member into its clamped position thereby clamping the conductor.

10. The method of claim 9 wherein said clamping member has first and second opposite ends, and includes a threaded bore coupled to said second end, and wherein said frame includes a correspondingly threaded shaft, said threaded shaft rotatably journalled in said threaded bore.

11. The clamp of claim 10 wherein a second end of said frame includes a first couple, and wherein said hot-stick head includes a second couple couplable with said first couple when said head is coupled onto said frame.

12. The method of claim 10 wherein said ring is said resiliently biased by a resilient biasing force into a locking position when said lock-out is in said first position to thereby prevent said rotation of said threaded shaft in said threaded bore, and wherein said actuator includes at least one magnet, wherein a magnetic attractive force of said at least one magnet is greater than said resilient biasing force whereby said lock-out is magnetically biased into said second position against a return biasing of said resilient biasing force.

13. The method of claim 12 wherein said resilient biasing force is provided by a spring, and wherein said frame includes a spring housing which contains said spring.

14. The method of claim 13 wherein said threaded shaft has opposite first and second ends, and wherein said second end extends from said frame so as to extend from said first couple, said second end of said threaded shaft adapted to engage said hot-stick head whereby a twisting movement of said hot-stick head caused by a corresponding twisting of the hot-stick causes rotation of said threaded shaft in said bore to thereby translate said clamping member relative to said frame.

15. The method if claim 14 wherein said shaft includes an eye at said second end of said shaft, and said head is adapted to releasably couple to said eye.

16. The method of claim 15 wherein the clamping member is a first clamping member, and the frame includes a second clamping member in opposed facing relation to said first clamping member, said first and second clamping members at opposite ends of said frame.

\* \* \* \* \*